United States Patent
Breuer et al.

(10) Patent No.: US 7,941,174 B2
(45) Date of Patent: May 10, 2011

(54) METHOD FOR MULTICODE TRANSMISSION BY A SUBSCRIBER STATION

(75) Inventors: Volker Breuer, Bötzow (DE); Thomas Ulrich, Bad Dürkheim (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 436 days.

(21) Appl. No.: 11/667,595

(22) PCT Filed: Oct. 6, 2005

(86) PCT No.: PCT/EP2005/055037
§ 371 (c)(1),
(2), (4) Date: Dec. 22, 2008

(87) PCT Pub. No.: WO2006/051026
PCT Pub. Date: May 18, 2006

(65) Prior Publication Data
US 2009/0131027 A1   May 21, 2009

(30) Foreign Application Priority Data
Nov. 11, 2004   (DE) .......................... 10 2004 054 626

(51) Int. Cl.
*H04B 7/00* (2006.01)
(52) U.S. Cl. ........ 455/522; 370/335; 370/342; 370/329; 370/341; 455/422.1
(58) Field of Classification Search .................. None
See application file for complete search history.

(56) References Cited

U.S. PATENT DOCUMENTS

| 6,266,321 | B1 | 7/2001 | Pehkonen et al. |
| 6,330,232 | B1* | 12/2001 | Fapojuwo .................... 370/342 |
| 6,865,393 | B1* | 3/2005 | Baum et al. ................ 455/452.2 |
| 2002/0012332 | A1* | 1/2002 | Tiedemann et al. .......... 370/335 |
| 2004/0066795 | A1* | 4/2004 | Zhang ........................... 370/442 |
| 2005/0281219 | A1* | 12/2005 | Kim et al. ..................... 370/328 |
| 2008/0159184 | A1* | 7/2008 | Niwano ........................ 370/278 |

FOREIGN PATENT DOCUMENTS

| DE | 198 23 504 | 12/1998 |
| EP | 1 154 667 A2 | 11/2001 |
| EP | 1 229 755 A2 | 8/2002 |
| EP | 1 545 040 | 6/2005 |
| EP | 1 365 520 B1 | 7/2005 |
| EP | 1 564 905 A2 | 8/2005 |
| JP | 11-74834 | 3/1999 |
| JP | 2002-118515 | 4/2002 |
| WO | 03/001681 | 1/2003 |

OTHER PUBLICATIONS

International Search Report for International Application No. PCT/EP2005/055037; mailed Jan. 9, 2006.
English Abstract for JP 2004-320164 A, Published Nov. 11, 2004.

* cited by examiner

*Primary Examiner* — Ajit Patel
(74) *Attorney, Agent, or Firm* — Staas & Halsey LLP

(57) ABSTRACT

In a radio communications system, several codes for transmitting messages are assigned to a subscriber station. A transmission power differential is determined between the total maximum transmission power of the subscriber station for the codes and the total transmission power of the subscriber station for the codes at the beginning of a message transmission, (the differential being respected by the subscriber station), by a first one of the codes.

19 Claims, 1 Drawing Sheet

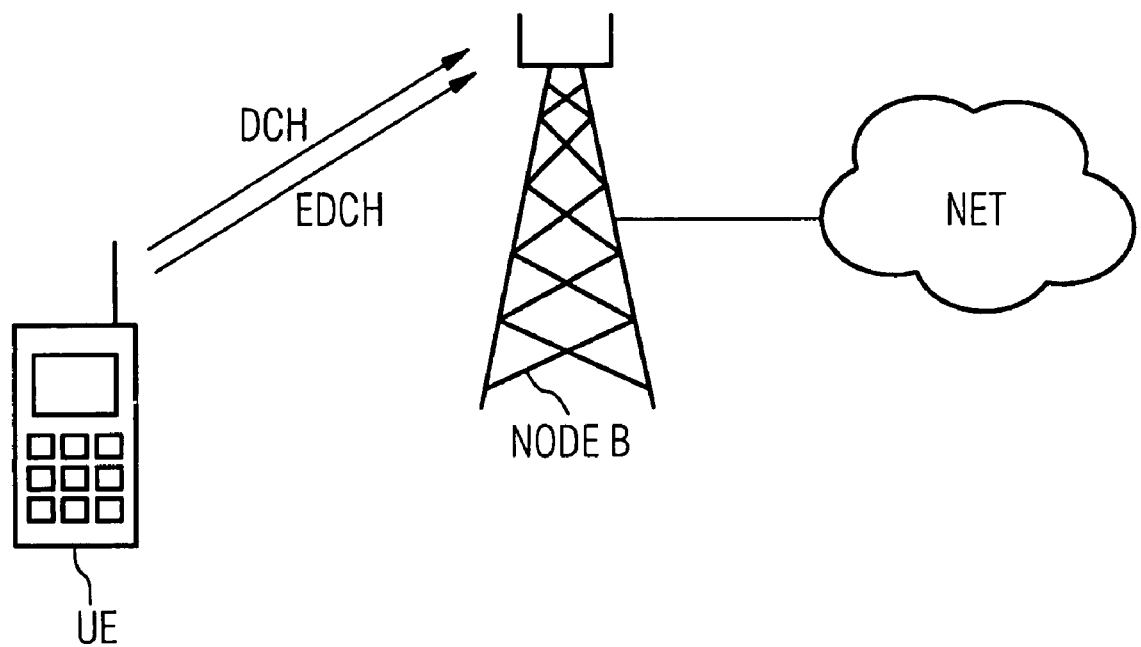

METHOD FOR MULTICODE TRANSMISSION BY A SUBSCRIBER STATION

CROSS REFERENCE TO RELATED APPLICATIONS

This application is based on and hereby claims priority to German Application No. 10 2004 054 626.6 filed on Nov. 11, 2004, the contents of which are hereby incorporated by reference.

BACKGROUND

Described below are methods for operating a radio communication system wherein a subscriber station is assigned a first and a second code for the purpose of transmitting messages.

In radio communication systems, messages containing, for example, voice information, image information, video information, SMS (Short Message Service), MMS (Multimedia Messaging Service) or other data are transmitted between a transmitting radio station and a receiving radio station via a radio interface with the aid of electromagnetic waves. Depending on the physical embodiment of the radio communication system, the radio stations in this case can be different types of subscriber radio stations or network-side radio stations such as base stations. In a mobile radio communication system at least some of the subscriber stations are mobile radio stations. The electromagnetic waves are emitted by carrier frequencies that lie in the frequency band provided for the respective system.

Mobile radio communication systems are often embodied as cellular systems, for example conforming to the GSM (Global System for Mobile Communication) or UMTS (Universal Mobile Telecommunications System) standard, having a network infrastructure formed of base stations, devices for monitoring and controlling the base stations and further network-side equipment. Apart from these cellular, hierarchical radio networks organized as wide area (supralocal) networks there are also wireless local networks such as, for example, WLANs (Wireless Local Area Networks) having a radio coverage area that is generally considerably more limited geographically. The cells covered by the radio access points (AP: Access Point) of the WLANs are usually small compared with typical mobile radio cells. Examples of different standards for WLANs are HiperLAN, DECT, IEEE 802.11, Bluetooth and WATM.

Access by subscriber stations to the common transmission medium is controlled in radio communication systems by multiple access (MA) methods/multiplex methods. With these multiple access techniques the transmission medium can be divided up between the subscriber stations in the time domain (Time Division Multiple Access, TDMA), in the frequency domain (Frequency Division Multiple Access, FDMA), in the code domain (Code Division Multiple Access, CDMA) or in the space domain (Space Division Multiple Access, SDMA). Combinations of multiple access methods are also possible.

With code division multiple access methods, subscriber-specific codes are used for communication with subscriber stations, with the result that in the downlink direction the respective subscriber station or, as the case may be, in the uplink direction network-side devices can differentiate the messages to or from the subscriber station from the messages to or from other subscriber stations by establishing a correlation between the received signal and the subscriber-specific code. It is possible for a subscriber station to use a plurality of codes for transmitting messages. In this case the different codes serve to distinguish different transmission channels used by the subscriber station, such as, for example, to distinguish between channels for transmitting payload and signaling information, or to distinguish channels of different services.

SUMMARY

An aspect is to disclose an efficient method for operating a radio communication system wherein a subscriber station is assigned a first and a second code for the purpose of transmitting messages. Devices for performing the method are also to be presented.

According to a first method for operating a radio communication system, a subscriber station is assigned a plurality of codes for transmitting messages. A transmit power difference to be maintained by the subscriber station is determined between on the one hand the total maximum transmit power of the subscriber station for the plurality of codes and on the other hand the total transmit power of the subscriber station for the plurality of codes at the start of a message transmission using a first of the plurality of codes.

According to a second method for operating a radio communication system wherein a subscriber station is assigned a plurality of codes for transmitting messages, a previously determined transmit power difference is maintained by the subscriber station between on the one hand the total maximum transmit power of the subscriber station for the plurality of codes and on the other hand the total transmit power of the subscriber station for the plurality of codes at the start of a message transmission using a first of the plurality of codes.

The subscriber station is assigned at least a first and a second code for the purpose of transmitting messages. Each of the different codes can be a combination of a plurality of individual codes; thus, according to UMTS, for example, the combination consisting of a spreading and a scrambling code. In addition to the plurality of codes that are involved in the method described below, further codes can also be used by the subscriber station for the purpose of transmitting messages.

A transmit power difference which is to be maintained by the subscriber station between a first and a second transmit power is determined. A difference between two values is maintained if the distance between the two values is greater than or equal to the difference. The first of the two transmit powers is the total maximum transmit power of the subscriber station for the plurality of codes, i.e. the maximum transmit power, when the subscriber station uses the plurality of codes in parallel for transmitting messages. The maximum transmit power for the parallel use of a plurality of codes is preferably predetermined by the hardware of the subscriber station, which is to say, for example, by the power amplifier which is intended to amplify in a linear manner but produces a nonlinear signal distortion in the power end range, for which reason it is not used in the end range. It is, however, also possible for the maximum transmit power for the parallel use of a plurality of codes of the subscriber station to be predefined on the network side.

The second of the two transmit powers is the total transmit power of the subscriber station for the plurality of codes at the start of a message transmission using a first of the codes. This corresponds to the sum of the transmit power for the first code and the transmit power for the remaining code or codes, and moreover in each case at the time of the start of the message transmission using the first code. If no message transmission using the remaining code or codes is performed precisely at the time of the start of the message transmission using the first code, but instead is only initiated a short time later, then the transmit power for the remaining code or codes at the point in time occurring a short time later can be used for the sum forming operation described.

If messages are transmitted using the first code at specific time intervals rather than continuously, the start of a time interval of this kind corresponds to the start of the message transmission using the first code. The method described below can be applied in relation to any such start time, i.e. to any message transmission using the first code, or to a subset of the start times.

The radio communication system under consideration can be a cellular mobile radio communication system, in particular a UTMS radio communication system, or also a local radio communication system.

the transmit power difference may be determined on the network side and a base station sends the subscriber station a message containing information relating to the determined transmit power difference. In this case the transmit power difference is determined not by the subscriber station, but by one or more devices of the infrastructure network of the radio communication system, in particular by the base station. After the network-side determination of the transmit power difference, information relating to the determined transmit power difference is notified to the subscriber station so that the subscriber station can extract the transmit power difference from the information or determine the transmit power difference from the information.

It is advantageous if the message to the subscriber station also contains information relating to a maximum data rate to be used by the subscriber station for the message transmission using the first code.

The transmit power difference may be determined as a function of a property of the base station and/or the radio cell of the base station, and/or of an interference situation, and/or of at least one service used by the subscriber station, and/or of a classification of the subscriber station. In this way the transmit power difference can be defined differently from base station to base station or, as the case may be, from radio cell to radio cell under conditions that are otherwise identical. With regard to the interference, the interference within the cell to which the subscriber station is assigned, and/or within cells adjacent to this cell, can be taken into account. It is advantageous in particular to take into account the type of service used by the subscriber station by transmitting messages using the first code during the determination of the transmit power difference. Subscriber stations can be classified or prioritized on the network side and handled in accordance with this classification during the determination of the transmit power difference.

The transmit power difference may be determined by the subscriber station. This difference can be determined in particular as a function of a plurality of transmit powers used in the past by the subscriber station for a second code, in particular using the variance of these transmit powers. This taking into account of the transmit powers used in the past can also be indirect, in that power control information received by the subscriber station in respect of the transmit powers used for the second code is used.

The network-side device and the subscriber station can have a transmit power difference which is to be maintained by the subscriber station between, on the one hand, the total maximum transmit power of the subscriber station for the plurality of codes and, on the other hand, the total transmit power of the subscriber station for the plurality of codes at the start of a message transmission using a first of the plurality of codes.

In addition or alternatively, the subscriber station can maintain a previously determined transmit power difference between, on the one hand, the total maximum transmit power of the subscriber station for the plurality of codes and, on the other hand, the total transmit power of the subscriber station for the plurality of codes at the start of a message transmission using a first of the plurality of codes.

BRIEF DESCRIPTION OF THE DRAWINGS

These and other objects and advantages will become more apparent and more readily appreciated from the following description of an exemplary embodiment, taken in conjunction with the accompanying drawings of which:

FIG. 1 is a pictorial diagram of a portion of a radio communication system.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

FIG. 1 shows a section of a UMTS radio communication system with a subscriber station UE (UE: User Equipment) and a base station NODE B. The base station NODE B is connected to further network-side devices of the infrastructure network NET. In the uplink (UL) direction the communication, i.e. the message transmission from the subscriber station UE to the base station NODE B, takes place on a dedicated channel, described, for example, in [3GPP TS 25.211 V6.2.0, 3rd Generation Partnership Project; Technical Specification Group Radio Access Network; Physical channels and mapping of transport channels onto physical channels (FDD)]. For this purpose the subscriber station UE is assigned the code DCH. A second code EDCH (Enhanced Dedicated Uplink Channel) is assigned to the subscriber station UE, in particular for transmitting high bit rate traffic.

In order to regulate the power in accordance with a closed loop power control, the base station NODE B sends the subscriber station UE power control instructions, the TPC bits, at regular intervals, i.e. information as to whether the transmit power is to be increased or decreased by the subscriber station UE. The subscriber station UE is subject to a maximum value for the transmit power which cannot be exceeded. In deteriorating radio transmission conditions the subscriber station UE is requested by the base station NODE B to increase its transmit power. The transmit power can be increased at most up to the maximum value of the transmit power of the subscriber station UE. If the subscriber station UE receives a further request to increase its transmit power after reaching the maximum value of its transmit power, it can adjust the TFC (Transport Format Combination) used by it. For each physical channel the TFC specifies the ratio of coded data, i.e. the total data, to the payload data, and consequently the data rate. For a given radio channel each TFC is uniquely linked to a transmit power. Under constant radio traffic conditions, therefore, a switch to a TFC with a lower data rate corresponds to a switch to a lower transmit power. In order to comply with the request of the base station NODE B for a transmit power increase, the subscriber station UE can thus switch to a TFC with a lower data rate and leave the transmit power unchanged or reduce it. The switching of a TFC can only take place at specific times, and moreover at specific TTI limits (TTI: Transmission Time Interval).

If the subscriber station UE uses not just the code DCH, but the two codes EDCH and DCH in parallel, the situation in which the subscriber station UE reaches the maximum value of its transmit power occurs more often than if the subscriber station UE uses only the code DCH. There are the following reasons for this:

The total transmit power of the subscriber station UE when using a plurality of codes is produced from the sum of the transmit powers of the individual codes. The total transmit power of the subscriber station UE is therefore higher on average, the more codes it uses.

The code EDCH is intended to be used for transmitting high bit rate data packets to the base station NODE B. In keeping with the link between data rate and transmit power via the TFC, the subscriber station UE requires a higher transmit power for the code EDCH than for the code DCH.

If the subscriber station UE uses the two codes EDCH and DCH in parallel, the maximum value of the transmit power can be reduced compared with the case where it uses only the code DCH. The reason for this is that in a multicode transmission the PAR value (PAR: Peak to Average Ratio) can be worse. This reduction in the maximum transmit power in a multicode transmission applies to most subscriber stations; if this reduction were to be avoided, higher requirements in terms of the linearity of the amplifiers of the subscriber stations would be necessary.

The length of an EDCH message (TTI: Transmission Time Interval) is 10 ms. During this time the subscriber station UE receives 15 TPC bits. The TFC for the code EDCH cannot be changed during the TTI, i.e. the subscriber station UE can respond to an instruction from the base station NODE B to increase its transmit power only by increasing the transmit power; adjusting the TFC for the code EDCH is not possible during the transmission of an EDCH message. Another possible way to respond to the request from the base station NODE B to increase the transmit power is to adjust the TFC for the code DCH. This can be switched by the subscriber station UE at the start of a TTI for the code DCH. The times of the TTI start of the two codes DCH and EDCH can be different from each other. In this way it is possible for the subscriber station UE to comply with the request to increase the transmit power during the transmission of an EDCH message by changing the TFC for the code DCH and thereby enabling the transmit power for the code EDCH to be increased if a suitable TTI limit for switching over the TFC is present. This is only possible, however, if the subscriber station UE is not already using the lowest possible data rate for the code DCH. However, this smallest TFC corresponding to the lowest possible data rate is always used by the subscriber station UE when it has little data to be transmitted using the code DCH.

If when using the two codes EDCH and DCH the subscriber station UE reaches the (reduced) maximum value of the transmit power during the transmission of an EDCH message, and if it receives instructions from the base station NODE B to continuously increase its transmit power, it must abort the transmission of the EDCH message before the end of the EDCH message if an adjustment of the TFC of the code DCH is not possible. Aborting the message transmission of the code DCH is not possible, for if the base station NODE B can no longer receive the messages of the code DCH, the connection between the base station NODE B and the subscriber station UE is interrupted, with the result that the maintaining of the communication using the code DCH for upholding the connection between subscriber station UE and base station NODE B is indispensable. Aborting the transmission of the EDCH message means wasting radio resources, since the incomplete EDCH message cannot be evaluated on the network side, yet interference has been generated due to the incomplete transmission of the EDCH message.

The subscriber station UE is notified by the base station NODE B prior to the transmission of an EDCH message of which TFC may be used at a maximum for this transmission, i.e. the maximum possible data rate for the EDCH message. Before the transmission of the EDCH message the subscriber station UE specifies a TFC which will be used for the EDCH message, taking into account that the maximum data rate assigned to it by the base station NODE B may not be exceeded. According to the radio traffic conditions or, as the case may be, the radio channel between the subscriber station UE and the base station NODE B, a specific transmit power for the transmission of the EDCH message is linked to the selected TFC under constant propagation conditions.

If the subscriber station UE chooses a high data rate and therefore a high transmit power for the transmission of the EDCH message, it is possible that it will receive a request to increase the transmit power several times during the transmission of the EDCH message, which ultimately can lead, as described in the foregoing, to the abortion of the transmission of the EDCH message since the maximum transmit power of the subscriber station UE would have been exceeded. If, on the other hand, the subscriber station UE chooses a low data rate and therefore a low transmit power for the transmission of the EDCH message, it is possible that if there are few requests to increase the transmit power a large part of the total transmit power available to the subscriber station UE will not be used and consequently a lower data rate was used for the EDCH message than would be possible and desirable from the point of view of the subscriber station UE. In selecting the TFC for the transmission of an EDCH message a compromise must therefore be found between a high data rate for the EDCH message and a reliable, i.e. complete, transmission of the EDCH message.

In order to solve this problem, it is proposed that a transmit power difference which is to be maintained by the subscriber station UE be determined by the base station NODE B. The transmit power difference, which can be termed the "power headroom", is required to exist between the total transmit power for the two codes DCH and EDCH at the start of the transmission of an EDCH message and the maximum transmit power for the two codes DCH and EDCH. The transmit power difference thus corresponds to an unused transmit power at the start of the transmission of an EDCH message. For illustration purposes a numeric example will be considered:

The maximum transmit power of the subscriber station UE when using only the code DCH, i.e. without multicode transmission, is 21 dBm.

Let the maximum transmit power of the subscriber station UE when using the two codes DCH and EDCH be reduced by 3 dB compared to the maximum transmit power when using only one code, i.e. it amounts to 21 dBm−3 dB=18 dBm.

For the code DCH let the subscriber station UE use the minimum possible data rate, this corresponding to a transmit power for the code DCH of 3 dBm given a specific assumed radio propagation condition. Thus, a maximum of 18 dBm−3 dB=15 dBm is available for the code EDCH.

Let the base station NODE B specify a transmit power difference of 8 dB for the subscriber station UE. This yields the maximum transmit power to be used by the subscriber station UE at the start of the transmission of the EDCH message as: 18 dBm−3 dB−8 dB=7 dBm.

The transmit power difference can be determined in the base station NODE B as a function of a number of parameters:

The Type of Cell of the Base Station NODE B.

A distinction can be made between "capacity limited" and "coverage limited" cells. A "capacity limited" cell is a cell in which the transmit power of the base station that is to be divided up among the subscriber stations in the downlink direction is the limiting factor for the cell size. This applies mostly to small cells in urban areas. The subscriber stations in such cells generally transmit at low transmit power, so the maximum transmit power of the subscriber stations is seldom reached. No large "power headroom" must therefore be set for a "capacity limited" cell, i.e. a base station of a "capacity limited" cell defines only small transmit power differences. A "coverage limited" cell is a cell in which the transmit power of the subscriber stations in the uplink direction is the limiting factor for the cell size. This applies mostly to large cells in rural areas. Since the subscriber stations of a "coverage limited" cell frequently reach their maximum transmit power, a large "power headroom" should be set at the start of the transmission of an EDCH message to ensure that sufficient scope for increasing the transmit power during the transmission of the EDCH message is present. A base station of a "coverage limited" cell will therefore define high transmit power differences.

The Current Interference Situation in the Cell or in an Area Formed by a Plurality of Cells.

The greater the current interference in a cell and/or in the surrounding cells, the higher the transmit power differences should be specified. The consequence of this is that subscriber stations which are located in the vicinity of the receiving base station and which therefore require a low transmit power and so generate little interference receive preference, i.e. achieve greater data rates for the EDCH messages than the more remote subscriber stations. Owing to the fact that the subscriber stations in the vicinity of the base station must use only low transmit powers to achieve high data rates, their EDCH transmissions scarcely experience any restrictions due to large transmit power differences. In contrast, subscriber stations which are very distant from the base station are subject to restrictions in respect of the transmission of EDCH messages, since only a low data rate is possible for the EDCH messages due to the great distance from the receiving base station or during the soft handover to the receiving base stations and due to the high transmit power difference, with the consequence that many of these subscriber stations must forego the transmission of EDCH messages. As a result the subscriber stations generate little interference in the surrounding cells. Specifying the transmit power difference thus represents a controlling intercell interference.

The Service Used by a Subscriber Station in Respect of the Code EDCH.

A distinction can be made between two basic types of services. Firstly there are services in which a minimum service rate is guaranteed (referred to as the Guaranteed Bit Rate, or GBR). These can be realtime services in which a reliable transmission is necessary, such as, for example, videotelephony and online gaming. A high transmit power difference should be specified for these services so that even if the radio channel deteriorates during the transmission of an EDCH message this can be made up for by an increase in the transmit power and the EDCH message can be transmitted without having to be aborted. Secondly there are services in which a high data rate is required, while an occasional breakdown in the transmission of an EDCH message does not have an overly negative impact. The aborted EDCH messages can be transmitted in full at a later time. Examples of this are non-realtime games. A low transmit power difference should be specified for the latter-mentioned services to ensure that a high data rate (maximum throughput) can be achieved for the EDCH messages.

The Strategy of the Network Operator in Respect of the EDCH.

If a high data throughput is to be achieved overall for all users via the EDCH, low transmit power differences should be defined by the base stations.

The Class of the Subscriber Station.

The subscriber stations can be classified, with subscriber stations belonging to a higher priority class having to maintain a lower transmit power difference than subscriber stations belonging to a lower priority class. Threshold values, for example, can be used as maximum values of the transmit power difference for subscriber stations belonging to certain classes. The lowering of the transmit power difference as the priority of the subscriber stations increases can be explained by the fact that the base station must divide up the total interference that is tolerable for the EDCH at its receiver for the EDCH channel of all subscriber stations between the subscriber stations. In particular the subscriber stations which are at a great distance from the base station generate an increased amount of interference. Using a low transmit power difference, a high priority subscriber station is allocated a large proportion of the interference that is to be divided up between the subscriber stations. When a high transmit power difference is to be maintained a subscriber station can decide that the respective data rate for the EDCH message is so small that it will dispense with the transmission of the EDCH message. If a high value for the transmit power difference is determined for the subscriber stations when a high level of interference is present, it is possible at these times for EDCH messages to be transmitted only by subscriber stations which have been assigned a high priority, since the defined transmit power difference is too high for the transmission of an EDCH message for the lower priority subscriber stations. The classification can have an effect on the billing of the respective subscriber.

When determining the transmit power difference the base station NODE B can use one of the described parameters or combinations of the parameters. The transmit power difference can be determined on a subscriber-station-specific basis, i.e. for individual subscriber stations, or for a group of subscriber stations or for all subscriber stations which use a code EDCH.

The transmit power difference is signaled to the subscriber station UE by the base station NODE B. It is possible that the subscriber station UE has to maintain the transmit power difference exactly, i.e. that the sum formed from the transmit powers for the two codes DCH and EDCH at the start of the transmission of the EDCH message differs from the maximum transmit power available for the two codes DCH and EDCH precisely by the transmit power difference, or that the transmit power difference defined by the base station NODE B represents a minimum value which must be present at least between the sum of the transmit powers for the two codes DCH and EDCH at the start of the transmission of the EDCH message and the maximum transmit power available for the two codes DCH and EDCH. The determined transmit power difference can be signaled using a message introduced specifically for these purposes, though the information relating to the transmit power difference can also be integrated into another message. It is advantageous in particular if a message is sent from the base station NODE B to the subscriber station UE containing both the specification of the transmit power difference requiring to be maintained and the specification of the TFC with the maximum data rate that may be used by the subscriber station UE for the respective transmission of the EDCH message. If the same transmit power difference is determined for a plurality of subscriber stations, these can be informed of the defined transmit power difference in a joint notification.

While the case has been described in which the transmit power difference is determined by the base station, the transmit power difference can also be determined by a device controlling the base station NODE B, such as, for example, by a CRNC (Controlling RNC). This device then informs the base station NODE B of the defined transmit power difference. As described above in relation to the message transmission between base station and subscriber station, the information relating to the defined transmit power difference is preferably contained in a message which also includes the specification of the TFC with the maximum data rate that may be used by the subscriber station for the respective transmission of the EDCH message.

As an alternative to the transmit power difference being defined by the base station NODE B, it can also be determined by the subscriber station UE. In this case the subscriber station UE can take into account the instructions received in the past concerning the transmit power control in relation to the code DCH, i.e. the TPC bits. If the transmit power for the code DCH within a specific period of time in the past lies, for example in the range between −10 dBm and +10 dBm, i.e. if the transmit power for the code DCH exhibits a great variance, the transmit power difference will be defined as a higher value by the subscriber station UE than in the case of a small variance, which is to say, for example, if the transmit power for the code DCH within the specific period of time in the past lies in the range between −3 dBm and +3 dBm. Thus, the variance of the transmit powers of a first channel, of the code DCH, is used to determine the transmit power for a second channel, for the code EDCH. The actual value for the transmit power of the code EDCH is determined by the subscriber station from the transmit power difference, the current value of the transmit power for the code DCH, the TFC for the code EDCH, the maximum value of which is predefined for it by the base station NODE B, its maximum transmit power for multicode transmission, and the current radio transmission conditions.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for operating a radio communication system in which a subscriber station is assigned a plurality of codes for transmitting messages, comprising:
    determining a transmit power difference which is to be maintained by the subscriber station between on one hand a total maximum transmit power of the subscriber station for the codes and on another hand a total transmit power of the subscriber station for the codes at a start of a message transmission using a first one of the codes.

2. The method as claimed in claim 1, wherein said determining of the transmit power difference is performed by a network device, and wherein said method further comprises sending from a base station to the subscriber station a message containing information relating to the transmit power difference as determined by the network device.

3. The method as claimed in claim 2, wherein the message to the subscriber station contains information relating to a maximum data rate to be used by the subscriber station for the message transmission using the first code.

4. The method as claimed in claim 3, wherein said determining of the transmit power difference is based on a function of at least one of a property of the base station, a property of a radio cell of the base station, an interference situation, at least one service used by the subscriber station, and a classification of the subscriber station.

5. The method as claimed in claim 2, wherein said determining of the transmit power difference is based on a function of at least one of a property of the base station, a property of a radio cell of the base station, an interference situation, at least one service used by the subscriber station, and a classification of the subscriber station.

6. The method as claimed in claim 1, wherein said determining of the transmit power difference is performed by the subscriber station.

7. The method as claimed in claim 6, wherein said determining of the transmit power difference is based on a function of a plurality of transmit powers used previously by the subscriber station for a second of the codes.

8. The method as claimed in claim 7, wherein the radio communication system is a Universal Mobile Telecommunications System radio communication system.

9. A method for operating a radio communication system in which a subscriber station is assigned a plurality of codes for transmitting messages, comprising:
    maintaining a previously determined transmit power difference by the subscriber station between on one hand a total maximum transmit power of the subscriber station for the codes and on another hand a total transmit power of the subscriber station for the codes at a start of a message transmission using a first one of the codes.

10. The method as claimed in claim 9, wherein the transmit power difference is determined on the network side and a base station sends the subscriber station a message containing information relating to the defined transmit power difference.

11. The method as claimed in claim 10, wherein the message to the subscriber station contains information relating to a maximum data rate to be used by the subscriber station for the message transmission using the first code.

12. The method as claimed in claim 11, wherein said determining of the transmit power difference is based on a function of at least one of a property of the base station, a property of a radio cell of the base station, an interference situation, at least one service used by the subscriber station, and a classification of the subscriber station.

13. The method as claimed in claim 10, wherein said determining of the transmit power difference is based on a function of at least one of a property of the base station, a property of a radio cell of the base station, an interference situation, at least one service used by the subscriber station, and a classification of the subscriber station.

14. The method as claimed in claim 9, wherein said determining of the transmit power difference is performed by the subscriber station.

15. The method as claimed in claim 14, wherein said determining of the transmit power difference is based on a function of a plurality of transmit powers used previously by the subscriber station for a second of the plurality of codes.

16. The method as claimed in claim 15, wherein the radio communication system is a Universal Mobile Telecommunications System radio communication system.

17. A base station in a radio communication system in which a subscriber station is assigned a plurality of codes for transmitting messages, comprising:
  at least one processor programmed to determine a transmit power difference which is to be maintained by the subscriber station between on one hand a total maximum transmit power of the subscriber station for the codes and on another hand a total transmit power of the subscriber station for the codes at a start of a message transmission using a first one of the codes.

18. A subscriber station for a radio communication system, the subscriber station assigned a plurality of codes for transmitting messages, comprising:
  at least one processor programmed to determine a transmit power difference which is to be maintained by the subscriber station between on one hand a total maximum transmit power of the subscriber station for the codes and on another hand a total transmit power of the subscriber station for the codes at a start of a message transmission using a first one of the codes.

19. A subscriber station as claimed in claim 18, wherein said at least one processor is further programmed to maintain the transmit power difference.

* * * * *